WILLIAM A. KIRBY.
Improvement in Harvester Rakes.
No. 125,308.  Patented April 2, 1872.
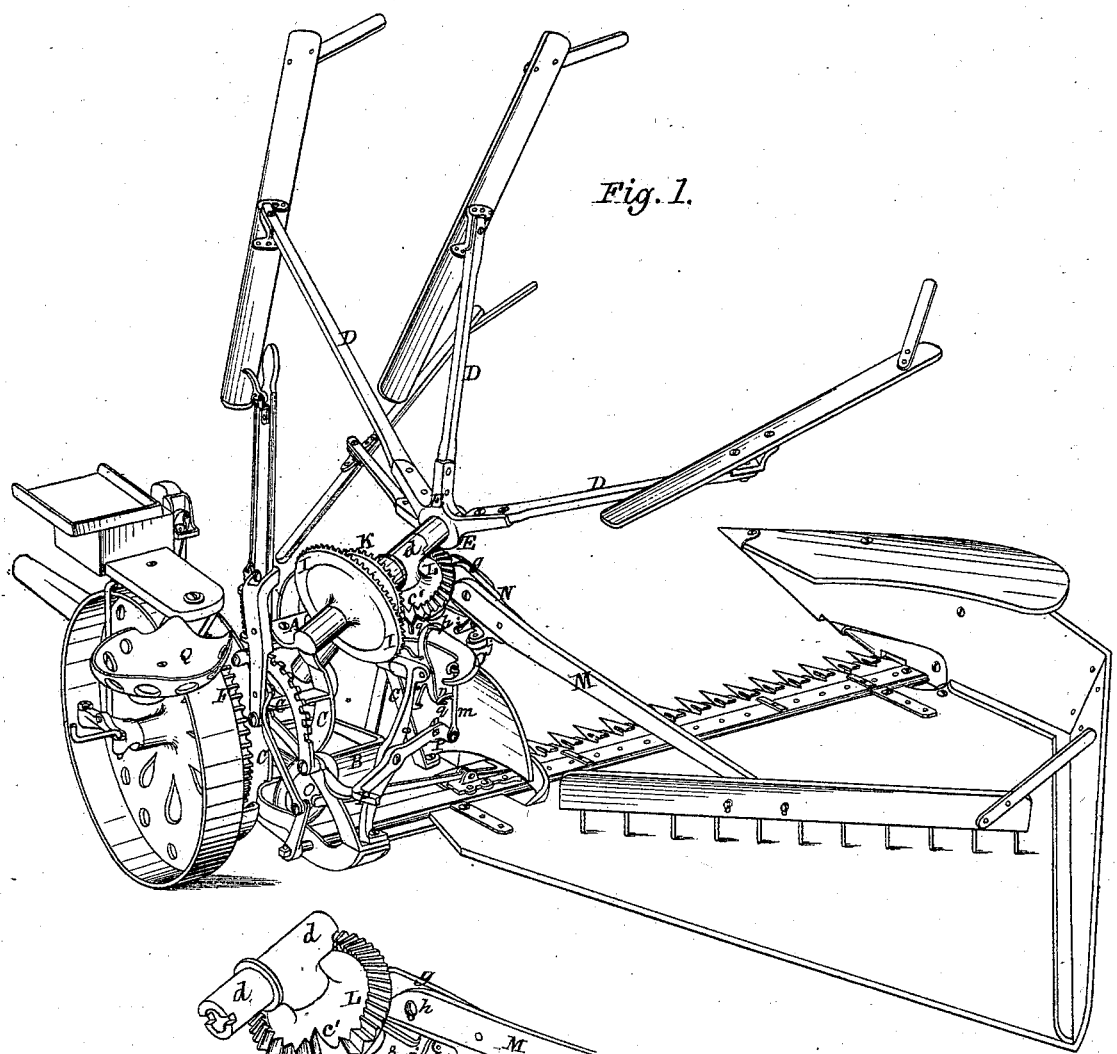
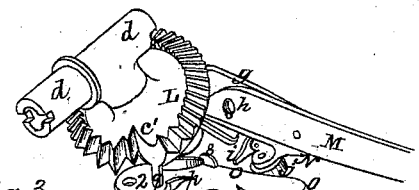
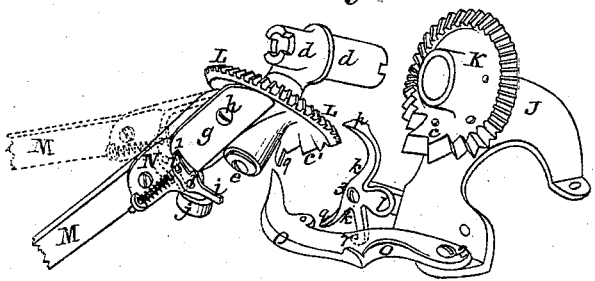

WILLIAM A. KIRBY.
Improvement in Harvester Rakes.
No. 125,308. Patented April 2, 1872.

Witnesses.
D. R. Cowl
Edmund Masson

Inventor.
William A. Kirby,
By atty. A. V. Stoughton.

125,308

UNITED STATES PATENT OFFICE.

WILLIAM A. KIRBY, OF AUBURN, NEW YORK, ASSIGNOR TO HIMSELF AND DAVID M. OSBORNE, OF SAME PLACE.

IMPROVEMENT IN HARVESTER-RAKES.

Specification forming part of Letters Patent No. 125,308, dated April 2, 1872.

*To all whom it may concern:*

Be it known that I, WILLIAM A. KIRBY, of Auburn, in the county of Cayuga and State of New York, have invented certain new and useful Improvements in Rakes and Rake-Operating Mechanism for Harvesting-Machines; and I do hereby declare the following to be a full, clear, and exact description of the same, reference being had to the accompanying drawings making a part of this specification, in which—

Figure 2:
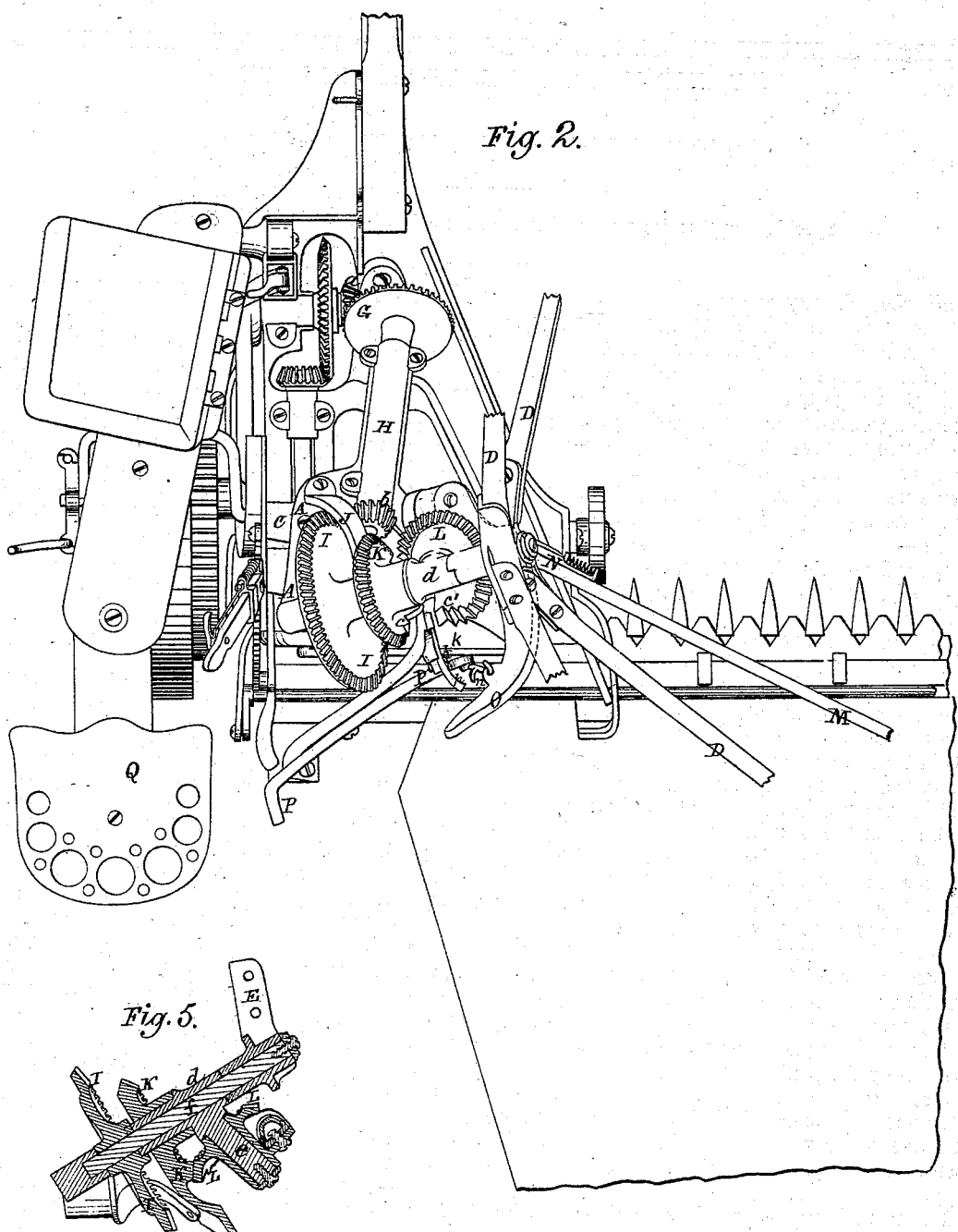
Figure 5:
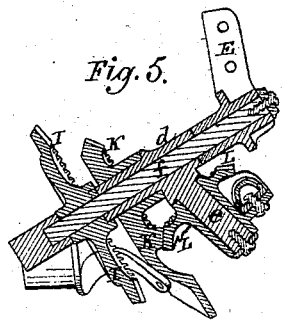

Figure 1 represents, in perspective, a harvesting-machine with the rake and rake-operating mechanism applied thereto. Fig. 2 represents a top plan of the rake and its mechanism, and of so much of the machine as will illustrate their operation. Figs. 3, 4, and 5 represent portions of the mechanism not so distinctly seen in the other figures.

Similar letters of reference, where they occur in the several separate figures, denote like parts of the mechanism in all of the drawings.

The nature of my invention consists in combining with a revolving-rake, or revolving rake and reel or beaters, irregular gears, whereby the rake may move across or over the platform in a horizontal (or nearly so) position, and thus sweep a flat platform of the cut grain; and the invention further consists in a certain combination of mechanism, whereby the rake may pass over the platform without sweeping it, and in so doing set the mechanism so that it will sweep the platform on the next round, unless again raised up.

To enable others skilled in the art to make and use my invention, I will proceed to describe the same with reference to the drawings.

The rake is represented as applied to what is known as the "Kirby machine," which is distinctly shown in the drawings, and need not be described in detail; but it is equally applicable to other harvesting-machines, and I so propose to use and apply it. The bracket A, in and on which the rake and rake-moving mechanism is supported and turns, is firmly secured to the main frame B by braces C. The reel or beater-arms D are secured in the head E, and revolve with said head, being driven from the main driving-wheel F through a bevel-pinion, $a$, on the shaft that drives the cutters—through or by means of a second gear and shaft in the ordinary way—the bevel-wheel G, and bevel-pinion $b$, on a shaft that passes through a sleeve or support, H, and a large bevel-wheel, I, on the shaft, to which the head E is fastened, and by and with which said head and the beaters connected to it are revolved. To a brace or permanent supporting-arms, J, there is fixed an immovable bevel-gear wheel, K, having some of its teeth, as at $c$, irregularly formed or cut, for a purpose to be hereafter explained. The hub and central portion of this bevel-gear K is so made that the shaft on which the large bevel-gear I and the head E are fixed may pass through and freely turn in said hub or central portion. To a sleeve, boss, or hub, $d$, through which, also, the shaft that carries the gear I and head E passes, but with which shaft said sleeve, boss, or hub turns, there is attached a journal, $e$, which is somewhat inclined, so as to form an angle less than a right angle, with regard to the outer end of the reel or beater driving-shaft $f$, Fig. 5. On this journal is placed and turns an irregular bevel-gear-wheel, L, having some of its teeth, $c'$ irregularly cut or formed, but so as to match and gear with the irregular teeth $c$ on the bevel-wheel K, with which it meshes, and around which it rolls and turns. On the irregular wheel L there is attached or formed a seat or shoe, $g$, to which the rake-arm M is pivoted at $h$, and on the rake-arm or its heel-piece N there is pivoted a spring-dog, $i$, which takes against a shoulder, 1, on the shoe $g$, to lock the rake-arm in a certain position—viz., its working position—but which dog is automatically thrown out when the rake is to pass over the platform without cleaning it, and again automatically thrown into action to set the rake for sweeping or clearing the platform on its next round. On said heel-piece N there is also a friction-roll, $j$, which runs on a cam-way when the rake is raised up, so as to pass over the platform without acting or sweeping it. The cam-way O is pivoted at 2 to the bracket or frame that supports the rake and its operative mechanism, and is supported on an inclined portion thereof, so that when it is moved upon its pivot it shall move upward and outward. To another portion of the bracket or gear-frame, as at 3, there is pivoted a dog or trigger, k, having a weight, l, attached to it to move it, when not otherwise controlled, into a certain position defined by the pin 4 coming against the bracket or frame; and to another portion of the bracket or frame, as at 5, there is pivoted a foot-lever, P, the outer end of which is connected to the cam-way O by a rod, m, on which there is a projecting arm, n. Near the outer end of the foot-lever P there is a small beveled projection, 6, and underneath this projection there is an opening, o, into which a hook, 7, on one of the arms of the trigger k takes to hold up said foot-lever, and through said foot-lever and the rod m to hold up the cam-way, so that the rake, by its friction-roll j, shall ride upon said cam-way, and at such height above the platform as will allow it to pass over without touching the cut grain lying thereon. When the cam-way is raised up by the foot-lever P, (which is done by the operator from his seat Q, by pressing his right foot upon the end of said lever,) and is caught and held up by the hook 7, as above described, and as the heel of the rake approaches, and is ready, through its friction-roll j, to take and ride upon said cam-way, the end of the spring-dog i comes against a projection, 8, on the cam-way, which throws said dog out of its notch or shoulder 1, and releasing the rake N from the shoe g, allows said rake to move on its pivot h. The rake so released rides up on the cam-way, which is held up for that purpose, until the projection 9 on the gear-wheel comes against the arm p on the trigger k, and, moving said trigger, it draws the hook 7 out of the opening o in the foot-lever P, and allows said foot-lever, together with the cam-way, to drop down, but be caught and held from going too far by the arm n on the rod m which is caught by the arm q of the trigger, as seen in Fig. 1. Previous, or at about the same time that the projection 9 on the gear-wheel trips the trigger k, to allow the parts to go into proper position for the rake to act at the next round, the shoe g moves upon the rake-heel N until the spring-dog i comes to and shoots into its notch or shoulder, and the rake and the shoe are again locked and moved together. There is a shoulder, r upon the dog i, which, when it comes against the shoulder 1 on the shoe, defines the extent of motion of the rake upon the shoe, or vice versa. Of the irregular gear-wheels K L, of which K is a fixed wheel and L a movable one around a journal, as well as rolling around the perimeter of the fixed gear K, it may be said that so long as the regular teeth or cogs of said wheels are in mesh, the rake is revolving in the arc of an irregular path, owing to the angle at which the journal or shaft of the moving or traveling-gear L stands in relation to the shaft of the immovable gear K. When, however, the irregular cogs or teeth c c' of these two wheels mesh or interlock, the motion of the rake is in a horizontal, instead of a circular path, and this horizontality continues until the rake has traversed nearly or entirely over the whole of the platform. The irregular teeth or cogs c c' are deeper and more remote from each other than the regular ones. The irregular teeth c of the fixed gear K (more distinctly seen in Fig. 4) project beyond the line of the regular cogs or teeth of said gear, and the irregular teeth c' of the movable gear L are cut deeper than the regular cogs of said gear, so that practically the gear K is enlarged in diameter where its irregular teeth are, and the gear L is similarly diminished in diameter where its irregular teeth are, and thus giving to said gear L a more slow motion than when the regular cogs are in mesh, and they roll against each other without actually driving all the time at the same speed, so that the rake travels, but not in a circular path. The importance of these irregular gears K L, and of their action upon the rake, consists in the facility with which such a rake may be made to travel over and sweep a perfectly flat platform.

There is much of the detail of this rake-driving mechanism; as, for instance, the manner in which the several parts are placed on and supported by a common shaft, f, and yet some of them independent of the rotation of said shaft, which is clearly shown, but which is not elaborately described, it not being deemed important to do so, as no specific claim is made to these details. Nor is it deemed necessary here to elaborately describe the many parts and devices of the machine itself, as they do not constitute any of the essentials of the novel matter claimed, and are, moreover, shown in the drawings.

Having thus fully described my invention, what I claim therein as new, and desire to secure by Letters Patent, is—

1. In combination with the movable and immovable gears L K, for revolving the rake, the irregular teeth or cogs c c' on said gears for moving the rake horizontally across the platform, substantially as described.

2. I also claim, in combination with the rake moved by the two gears K L, and in an irregular path or circuit, the spring-latch i, for locking said rake to its shoe, and for unlatching it when the rake is to rise to cross the platform without clearing it, substantially as described.

3. I also claim the combination of the pivoted and latched or unlatched rake-arm with the pivoted cam-way, whereby said cam-way, when thrown up, shall first unlatch the rake, and then admit of its being again latched, as and for the purpose described.

4. I also claim the combination of the movable and immovable gears K L, the foot-lever P, pivoted cam-way O, link m, and trigger or dog $k$, for raising and holding up the cam-way when the rake is not to clear the platform, substantially as described.

5. I also claim, in combination with the gears L K and the trigger or dog $k$, for catching and holding up the foot-lever and cam-way, the projection 9 on the gear-wheel for tripping said trigger and allowing said lever and cam-way to drop, and thus set the rake for sweeping the platform, on its next round, as described.

WM. A. KIRBY.

Witnesses
 HORACE T. COOK,
 O. M. GODDARD.